(12) United States Patent
Chung et al.

(10) Patent No.: US 7,064,909 B2
(45) Date of Patent: Jun. 20, 2006

(54) IMAGE PICKUP LENS ASSEMBLY WITH A FILTER LENS

(75) Inventors: Feng-Cheng Chung, Tainan (TW); Jui-Hsin Lin, Taipei (TW); Hsin-Wu Lai, Taipei (TW)

(73) Assignee: Prodisc Technology Inc., Taipei Hsien (TW)

( * ) Notice: Subject to any disclaimer, the term of this patent is extended or adjusted under 35 U.S.C. 154(b) by 0 days.

(21) Appl. No.: 10/926,019

(22) Filed: Aug. 26, 2004

(65) Prior Publication Data

US 2006/0050416 A1    Mar. 9, 2006

(51) Int. Cl.
*G02B 7/02* (2006.01)
*H04N 5/225* (2006.01)

(52) U.S. Cl. ..................... 359/819; 348/340

(58) Field of Classification Search ............... 359/819, 359/739–740; 396/526; 348/340; 362/455; 353/100
See application file for complete search history.

(56) References Cited

U.S. PATENT DOCUMENTS

| | | | | |
|---|---|---|---|---|
| 5,377,048 A | * | 12/1994 | Tada et al. | 359/823 |
| 6,898,030 B1 | * | 5/2005 | Lin et al. | 359/819 |
| 2003/0025826 A1 | * | 2/2003 | Nakajoh | 348/374 |

FOREIGN PATENT DOCUMENTS

| | | | |
|---|---|---|---|
| EP | 1351316 A2 | * | 10/2003 |
| JP | 2002182270 A | * | 6/2002 |
| JP | 2003114308 A | * | 4/2003 |
| JP | 2005049780 A | * | 2/2005 |

* cited by examiner

Primary Examiner—David N. Spector
(74) Attorney, Agent, or Firm—Birch, Stewart, Kolasch & Birch, LLP

(57) ABSTRACT

An image pickup assembly with a filter lens includes a barrel, a first lens and a second lens. In this case, the barrel has a container and a diaphragm. The first lens is accommodated in the container. The second lens is also accommodated in the container. Wherein, at least one of the first lens and the second lens is a filter lens.

16 Claims, 3 Drawing Sheets

IMAGE PICKUP LENS ASSEMBLY WITH A FILTER LENS

BACKGROUND OF THE INVENTION

1. Field of Invention

The invention relates to an image pickup lens assembly and, in particular, to an image pickup lens assembly with a filter lens, which is for absorbing interfering light.

2. Related Art

With reference to FIG. 1, a conventional image pickup lens assembly 1 includes a barrel 11, a first lens 12, a second lens 13, a blocking filter 14, a sensor 15, and a holder 16.

The barrel 11, which includes a container 111 and a diaphragm 112, connects to the holder 16. The first lens 12 and the second lens 13 are accommodated in the container 111. The blocking filter 14 is set on the holder 16.

The sensor 15 is disposed on a substrate 17, such as a printed circuit board or a flexible board. The holder 16 is connected to the substrate 17, and the holder 16 is adhered to the substrate 17.

In this case, the sensor 15 can be a charge coupled device (CCD) or a complementary metal oxide semiconductor (CMOS) sensor. The sensor 15 is for receiving a light beam, which enters the diaphragm 112 and passes through the first lens 12, the second lens 13 and the blocking filter 14. Wherein, the blocking filter 14 is used to block the infrared rays and ultraviolet rays that interfere with the sensor 15. In addition, the first lens 12 and the second lens 13 can be aspherical lenses produced by the way of plastic injection molding or glass molding. Alternatively, the first lens 12 and the second lens 13 also can be spherical lenses produced by the way of grinding.

However, when the blocking filter 14 is not clear, such as the particles are deposited on the blocking filter 14, the portion of light beams may be blocked from entering. Therefore, part pixels of the sensor 15 cannot receive the light beams that results in decreasing sensitivity of part pixels. Thus, the image quality is affected. Accordingly, in order to demand the clearness requirement for manufacturing the blocking filter 14, the production yield is low and the manufacturing cost is high. Presently, those skilled people coats multi-layers of infrared rays filter on a curved lens to increase production yield and decrease manufacturing cost. However, the disadvantage experienced with above mentioned process is that relative difficult on manufacturing.

Therefore, according to the above-mentioned problems of the state of the art, it is a subjective to provide an image pickup assembly, which is much easier on manufacturing, less in number of assemblies, as well as has an effect on blocking specific wavelength light.

SUMMARY OF THE INVENTION

In view of the foregoing, the invention is to provide an image pickup assembly with a filter lens that is much easier on manufacturing, less in number of assemblies, and has an effect on absorbing specific wavelength light interfering with the sensor.

To achieve the above, an image pickup assembly with a filter lens of the invention includes a barrel, a first lens and a second lens. In this invention, the barrel has a container and a diaphragm. The first lens is accommodated in the container. The second lens is also accommodated in the container. Wherein, at least one of the first lens and the second lens is a filter lens.

As mentioned above, the image pickup assembly with the filter lens of the invention is consisting of at least one filter lens. Due to the filter lens itself has a property of absorbing specific wavelength light, the image pickup lens assembly with the filter lens is able to block the light interfering with a sensor. In addition, comparing with the prior art, the present invention has no need of setting elements, such as the blocking filter or the lens coated with multi-layers of infrared filters and so on. Thus, the present invention enables to simplify steps of assembly and manufacturing processes to achieve the same effects and further reduce the number of the assemblies.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
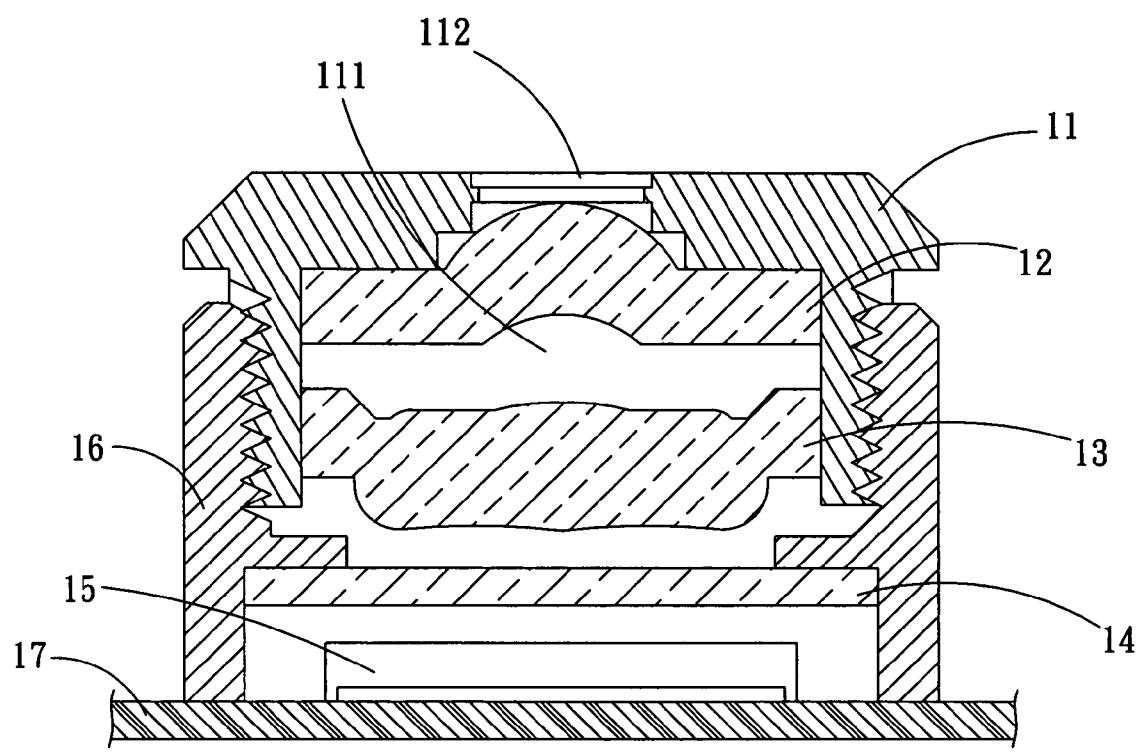
FIG. 1 is a sectional view showing the conventional image pickup lens assembly.
Figure 2:
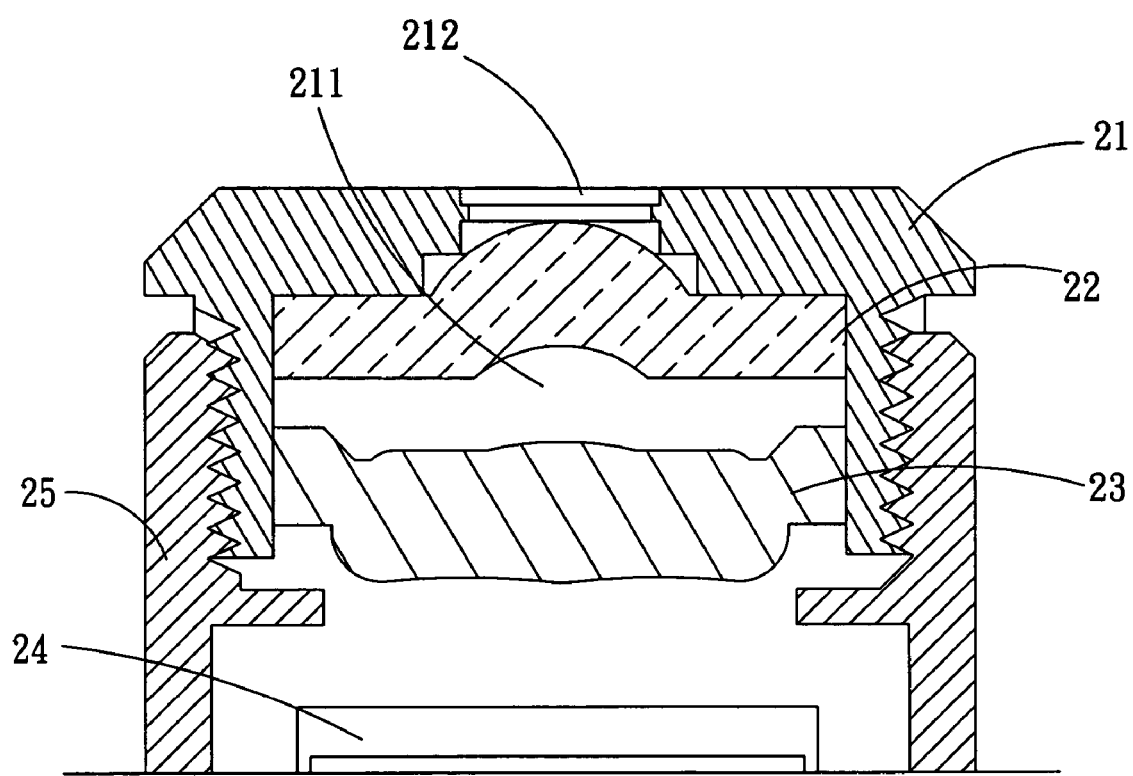
FIG. 2 is a sectional view showing an image pickup lens assembly with a filter lens according to a preferred embodiment of the invention.

With reference to FIG. 2, the image pickup lens assembly 2 with a filter lens according to the embodiment of the invention comprises a barrel 21, a first lens 22 and a second lens 23.

The barrel 21 has a container 211 and a diaphragm 212. The first lens 22 is accommodated in the container 211. The second lens 23 is also accommodated in the container 211. Wherein, at least one of the first lens and the second lens is a filter lens.

The filter lens is a lens for absorbing specific wavelength light. In the present embodiment, the filter lens is made of a blue glass composition, which absorbs infrared rays and ultraviolet rays. The image pickup lens assembly is by the way of receiving a light beam, which enters the diaphragm 212, passes through the first lens 22 and the second lens 23, and finally be received by a sensor 24 to construct the image. In order to prevent the sensor 24 from interfering with unnecessary light, the filter lens set in the image pickup lens assembly is to block the interfering light. In the present embodiment, the filter lens can be a spherical lens or an aspherical lens. The sensor 24 can be a charge coupled device (CCD) or a complementary metal oxide semiconductor (CMOS) sensor.

The image pickup lens assembly 2 with a filter lens according to the embodiment of the invention further comprises at least one anti-reflection coating (AR Coating), which is coated on relative both sides of the filter lens. As the anti-reflection effect of the anti-reflection coating, the transmittance of the filter lens is enhanced. Thus the image definition of the image pickup lens assembly 2 with the filter lens is improved.

In the present embodiment, the manufacturing processes of the filter lens employ molding or injection molding technologies, and the material thereof is the blue composition. After that, the both sides of the filter lens are coated with the anti-reflection coating to final accomplish.

Alternatively, in the present embodiment, the first lens 22 can be the filter lens and the second lens 23 is a plastic lens or a glass lens. In another hand, the first lens 22 also can be the plastic lens or the glass lens and the second lens 23 is the filter lens. Certainly, both the first lens 22 and the second lens 23 also can be the filter lenses. Using one of diverse compositions mentioned above to construct the image pickup lens assembly with the filter lens of the invention, the objective of blocking the interfering light can be achieved.

The image pickup lens assembly 2 with the filter lens according to the embodiment of the invention further comprises a holder 25, which is connected to the barrel 21 by locking each other. Further with the sensor 24 to construct an optical system can be applied to the image module of a cell phone.

Figure 3:
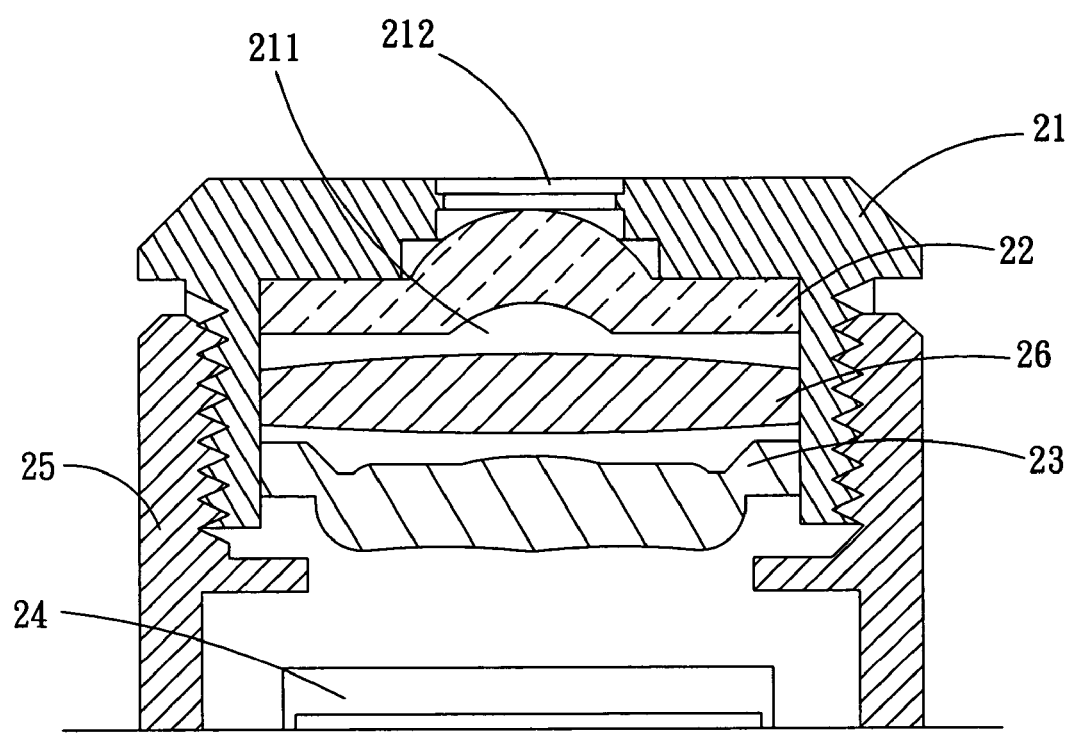
FIG. 3 is a sectional view showing an image pickup lens assembly with filter lens put concretely into practice according to a preferred embodiment of the invention.

With reference to FIG. 3, in the present embodiment, the image pickup lens assembly 2 with the filter lens further comprises a third lens 26, which is accommodated in the container 211 and set in between the first lens 22 and the second lens 23. As mentioned above, the third lens 26 could be the filter lens, the plastic lens or the glass lens. Certainly, the image pickup lens assembly 2 with the filter lens can further comprise a fourth lens and so on.

In conclusion, the image pickup lens assembly 2 with filter lens according to the embodiment of the invention is consisting of at least one filter lens, which is a lens itself has a property of absorbing interfering light, so that the image pickup lens assembly 2 with the filter lens has an effect of blocking the light interfering with the sensor. Comparing with the prior art, the present invention has no need of setting elements, such as the blocking filter or the lens coated with multi-layers of infrared filters and so on, in the image pickup lens assembly. Thus the image pickup lens assembly with the filter lens has advantage of reducing the number of the assemblies and then simplifying the steps of the manufacturing and assemblage.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. An image pickup lens assembly with a filter lens, comprising:
    a barrel, which has a container and a diaphragm;
    a first lens, which is accommodated in the container; and
    a second lens, which is accommodated in the container, wherein at least one of the first lens and the second lens is a filter lens.

2. The image pickup lens assembly of claim 1, wherein the filter lens is a lens for absorbing specific wavelength light.

3. The image pickup lens assembly of claim 1, wherein the filter lens is made of a blue glass composition.

4. The image pickup lens assembly of claim 3, wherein the blue glass composition absorbs infrared rays and ultraviolet rays.

5. The image pickup lens assembly of claim 3, further comprising:
    at least one anti-reflection film, which is coated on relative both sides of the filter lens.

6. The image pickup lens assembly of claim 1, wherein the filter lens is a spherical lens.

7. The image pickup lens assembly of claim 1, wherein the filter lens is an aspherical lens.

8. The image pickup lens assembly of claim 1, wherein the first lens is the filter lens and the second lens is a plastic lens.

9. The image pickup lens assembly of claim 1, wherein the first lens is the filter lens and the second lens is a glass lens.

10. The image pickup lens assembly of claim 1, wherein the first lens and the second lens are both the filter lenses.

11. The image pickup lens assembly of claim 1, further comprising:
    a holder, which is connected to the barrel.

12. The image pickup lens assembly of claim 1, wherein a light beam enters the diaphragm, passes through the first lens and the second lens, and is received by a sensor.

13. The image pickup lens assembly of claim 1, further comprising:
    a third lens, which is accommodated in the container and is located between the first lens and the second lens.

14. The image pickup lens assembly of claim 13, wherein the third lens is the filter lens.

15. The image pickup lens assembly of claim 13, wherein the third lens is a plastic lens.

16. The image pickup lens assembly of claim 13, wherein the third lens is a glass lens.

* * * * *